(12) United States Patent
Yanase et al.

(10) Patent No.: US 6,187,902 B1
(45) Date of Patent: Feb. 13, 2001

(54) PRODUCTION PROCESS OF HYDROPHILIC CROSSLINKED POLYMER

(75) Inventors: Toru Yanase, Ibo-gun; Koji Miyake, Himeji; Takumi Hatsuda, Takasago; Akito Yano, Himeji, all of (JP)

(73) Assignee: Nippon Shokubai Co., Ltd., Osaka (JP)

( * ) Notice: Under 35 U.S.C. 154(b), the term of this patent shall be extended for 0 days.

(21) Appl. No.: 09/208,820

(22) Filed: Dec. 9, 1998

(30) Foreign Application Priority Data

Dec. 25, 1997 (JP) ...................................................... 9-358147

(51) Int. Cl.⁷ .................................. C08J 3/00; C08F 2/00
(52) U.S. Cl. ......................... 528/503; 526/88; 526/317.1; 526/318.4; 528/499; 528/502
(58) Field of Search .................................. 526/88, 317.1, 526/318.4; 528/499, 502, 503

(56) References Cited

U.S. PATENT DOCUMENTS 4,914,170    4/1990    Chang et al. .
5,250,640    10/1993   Irie et al. .

FOREIGN PATENT DOCUMENTS

| 0 508 810 | 10/1992 | (EP) . |
| 0 629 411 | 12/1994 | (EP) . |
| 0 811 636 | 12/1997 | (EP) . |
| 8-506363  | 7/1996  | (JP) . |
| WO94/09043| 4/1994  | (WO) . |

*Primary Examiner*—Samuel A. Acquah

(57) ABSTRACT

The present invention provides a production process, in which hydrophilic crosslinked polymers can be dried uniformly with good efficiency, and the deterioration during the drying is little. The production process of a hydrophilic crosslinked polymer comprises the steps of polymerizing an aqueous solution including a hydrophilic monomer and a crosslinking agent to obtain a hydrogel crosslinked polymer, and drying the hydrogel crosslinked polymer, thus obtaining the hydrophilic crosslinked polymer, and is characterized in that: the hydrogel crosslinked polymer is dried in a static state until it becomes possible to disintegrate an aggregate of the hydrogel crosslinked polymer; the dried hydrogel crosslinked polymer is disintegrated into a particle size of 20 mm or less; and the disintegrated hydrogel crosslinked polymer is dried in a stirred state and/or a fluidized state.

12 Claims, No Drawings

PRODUCTION PROCESS OF HYDROPHILIC CROSSLINKED POLYMER

BACKGROUND OF THE INVENTION

A. Technical Field

The present invention relates to: a production process of a hydrophilic crosslinked polymer, more particularly, a production process in which hydrophilic crosslinked polymers such as water-absorbent resins can be dried uniformly with good efficiency.

B. Background Art

Generally, a hydrophilic crosslinked polymer is produced by polymerizing a solution including a hydrophilic monomer and a crosslinking agent, and then drying the resultant polymer. As a drying method, various methods such as static drying, stirring drying, and pneumatic drying are known, and these methods are properly employed according to natures and usages of polymers.

In the case where the hydrophilic crosslinked polymer is, for example, a water-absorbent resin, it is difficult to apply the stirring drying and the pneumatic drying, and the drying needs to be carried out in a static state, because the obtained polymer is usually a hydrogel and has strong tackiness and aggregates in the midway of drying.

However, though a surface portion is fast dried by the drying in a static state, there is a problem that an internal potion with which a hot wind is difficult to touch is hardly dried and the drying becomes non-uniform. Also, when the water content is dried to about 1~8 weight % by the static drying, there is a problem that partly excessively dried portions occur and these portions are deteriorated and have much soluble content. For the purpose of solving this problem, it is carried out to grind dried products in the midway of drying and then further dry them (Japanese Patent Publication (Kohyo) 08-506363 and so on), but it is still insufficient.

SUMMARY OF THE INVENTION

A. Object of the Invention

It is an object of the present invention to provide a production process, in which hydrophilic crosslinked polymers can be dried uniformly with good efficiency, and the deterioration during the drying is little.

B. Disclosure of the Invention

To solve the above problems, the present invention provides the below production processes of a hydrophilic crosslinked polymer.

(1) A production process of a hydrophilic crosslinked polymer , comprising the steps of polymerizing an aqueous solution including a hydrophilic monomer and a crosslinking agent to obtain a hydrogel crosslinked polymer, and drying the hydrogel crosslinked polymer, thus obtaining the hydrophilic crosslinked polymer, with the process being characterized in that: the hydrogel crosslinked polymer is dried in a static state until it becomes possible to disintegrate an aggregate of the hydrogel crosslinked polymer; the dried hydrogel crosslinked polymer is disintegrated into a particle size of 20 mm or less; and the disintegrated hydrogel crosslinked polymer is dried in a stirred state and/or a fluidized state.

(2) A production process of a hydrophilic crosslinked polymer according to process (1) above, wherein the drying in a static state is carried out until the water content of the hydrogel crosslinked polymer becomes 10~20 weight %.

(3) A production process of a hydrophilic crosslinked polymer according to process (1) or (2) above, wherein the drying in a static state is carried out by a drying method in which the hydrogel crosslinked polymer is brought into contact with a hot wind of 120~220° C.

(4) A production process of a hydrophilic crosslinked polymer according to any one of processes (1) to (3) above, wherein the drying in a stirred state and/or a fluidized state is carried out by a drying method in which the hydrogel crosslinked polymer is dried while stirred by rotation of a rotor.

(5) A production process of a hydrophilic crosslinked polymer according to any one of processes (1) to (3) above, wherein the drying in a stirred state and/or a fluidized state is carried out using a fluidized bed.

These and other objects and the advantages of the present invention will be more fully apparent from the following detailed disclosure.

DETAILED DESCRIPTION OF THE INVENTION

Examples of the hydrophilic monomer in the present invention are water-soluble monomers including an ethylenically unsaturated group as follows: anionic monomers and their salts such as (meth)acrylic acid, maleic acid (anhydride), fumaric acid, crotonic acid, itaconic acid, 2-(meth)acryloylethanesulfonic acid, 2-(meth)acryloylpropanesulfonic acid, 2-(meth)acrylamido-2-methylpropanesulfonic acid, vinylsulfonic acid, and styrenesulfonic acid; nonionic monomers including a hydrophilic group such as (meth)acrylamide, N-substituted (meth)acrylamide, 2-hydroxyethyl (meth)acrylate, 2-hydroxypropyl (meth)acrylate, methoxypolyethylene glycol (meth)acrylate and polyethylene glycol (meth)acrylate; and unsaturated monomers including an amino group and their quaternization products such as N,N-dimethylaminoethyl (meth)acrylate, N,N-dimethylaminopropyl (meth)acrylate and N,N-dimethylaminopropyl(meth)acrylamide. Particularly, (meth)acrylic acid and their salts are preferable.

The hydrophilic crosslinked polymer is obtained by polymerizing a solution including the above hydrophilic monomer and a crosslinking agent. The concentration of the hydrophilic monomer during the polymerization is preferably in the range of 20~50 weight % from a viewpoint of the polymerizability of the monomer or the control of the polymerization. The above crosslinking agent is not especially limited if it is a crosslinking agent which forms a crosslinking structure when or after polymerizing, and its examples are as follows: compounds having 2 or more polymerizable unsaturated double bonds per molecule; compounds having 2 or more groups, reactable with a functional group of the hydrophilic monomer such as an acid group, a hydroxyl group, and an amino group, per molecule; compounds having 1 or more unsaturated bonds as well as 1 or more groups reactable with the functional group of the monomer per molecule: compounds having 2 or more sites reactable with the functional group of the monomer per molecule: and hydrophilic polymers which can form a crosslinking structure by graft bonding and so on when monomer components are polymerized. Among the hydrophilic crosslinked polymers, particularly, the water-absorbent resin is usually obtained as a hydrogel polymer derived from its crosslinking structure, so it is effective to carry out two-step drying according to the present invention. The water-absorbent resin in the present invention is a hydrophilic crosslinked polymer with an absorption capacity of 10 g/g or more for aqueous liquids such as water and urine.

In the present invention, drying (first-step drying) of the hydrogel crosslinked polymer obtained by the polymerization is carried out in a static state until it becomes possible to disintegrate an aggregate as formed by aggregation of the polymer due to the drying, and then, after disintegrating the aggregate into a particle size of 20 mm or less, further drying (second-step drying) is carried out in a stirred state and/or a fluidized state.

The water content of the hydrogel crosslinked polymer, obtained by the polymerization and provided to the first-step drying, is usually in the range of 50~80 weight %, and such a hydrogel crosslinked polymer has strong tackiness and aggregates in the midway of drying, so the drying in a stirred state and/or a fluidized state is difficult and it is necessary to carry out the drying in a static state. The method for the drying in a static state is not especially limited if it can dry materials in a static state, and any conventional drying method of batch or continuous type or direct and/or indirect heating types can be used. Examples are as follows: parallel flow band or tunnel drying machine; through-flow band or tunnel drying machine; vacuum drying machine of static type; and drum drying machine. The through-flow band drying machine is especially preferable.

The particle diameter of the above hydrogel crosslinked polymer provided to the first-step drying is generally in the range of 0.1~50 mm, preferably in the range of 0.5~20 mm. Especially, it is preferable that 90% or more of the hydrogel crosslinked polymer has a particle diameter of 0.5~5 mm.

The first-step drying is carried out until it becomes possible to disintegrate an aggregate as formed by aggregation of the polymer due to the drying. Concretely speaking, the standard is such that the water content is 25 weight % or less. The water content is preferably in the range of 8~20 weight % and is more preferably in the range of 10~20 weight %. In the case where the drying is carried out in a static state until the water content becomes less than 8 weight %, the drying period becomes long, and further there is a possibility that physical properties might be deteriorated because, for example, portions which are partly excessively dried occur and increase the soluble content. In the case where the water content is higher than 25 weight %, the tackiness of the hydrogel crosslinked polymer is so high that the aggregate of the polymer is difficult to disintegrate, and further, the disintegrated polymer might aggregate again during the drying in a stirred state and/or a fluidized state.

As to the condition of the first-step drying, the layer thickness of the polymer is preferably in the range of 10~200 mm and is more preferably 20~100 mm. In the case where it is less than 10 mm, the productivity is low. Also, in the case where it is 200 mm or more, the internal portion of the polymer is hardly dried. The temperature is preferably in the range of 120~220° C. and it is preferable to bring the polymer into contact with a hot wind of this temperature range. The dew point of the hot wind is preferably in the range of 5~100° C. and the linear speed is preferably in the range of 0.5~3 m/second. As to the direction of the wind, it is preferable to allow the wind to flow in the direction perpendicular to the hydrophilic crosslinked polymer layer. However, the flow direction is not limited to only one of the upward and downward directions, and it is possible to switch the upward and downward directions to each other during the drying. As to a belt for mounting the polymer thereon, a metal net and a punched plate can be used.

The hydrogel crosslinked polymer aggregates into one body by the first-step drying in a static state, so, thereafter, the hydrogel crosslinked polymer is disintegrated into a particle size of 20 mm or below. The "particle size of 20 mm or below" means that 90% or more of the hydrogel crosslinked polymer can pass through a screen of 20 mm. The particle size is preferably 10 mm or below and is more preferably 5 mm or below. In the case where the hydrogel crosslinked polymer is disintegrated into a particle size exceeding 20 mm, the effect of the disintegration is little and the drying speed is slow. The disintegration in the present invention means taking an aggregate of the hydrogel crosslinked polymer to pieces, wherein the aggregate is formed by aggregation of the hydrogel crosslinked polymer due to the drying.

The method of the disintegration is not especially limited and examples are as follows: jaw crusher, roll crusher, hammer crusher, hammer mill, roll mill, cutter mill, pin mill, ball mill and roller mill.

After the disintegration, the second-step drying is carried out by the drying in a stirred state and/or a fluidized state. The drying in a stirred state and/or a fluidized state is preferable in that the drying efficiency is high and in that the uniform drying can be carried out. The drying method in a stirred state and/or a fluidized state is not especially limited if it can dry materials in a stirred state and/or a fluidized state, and any conventional drying method of batch or continuous type or direct and/or indirect heating types can be used. Concrete examples thereof are as follows: through-flow vertical type drying machines, cylinder stirring drying machines, channel type stirring drying machines, rotary drying machines, rotary drying machines with a steam tube, through-flow rotary drying machines, fluidized bed drying machines, conical dryers, vibration fluidized bed drying machines, and pneumatic dryers. Particularly preferable examples are as follows: drying machines, such as cylinder stirring drying machines and channel type stirring drying machines, which dry the hydrogel crosslinked polymer while the polymer is stirred by a rotation of a rotor; and fluidized bed drying machines. The above rotor is not especially limited if it stirs the dried product, and is constituted, for example, with an arm, a vane and a paddle.

The polymer is dried by the second-step drying to such a degree that the resultant dried polymer can be ground without hindrance using a tool such as a multistage roll mill, a pin mill, or a hammer mill so that 90% or more of the resultant ground polymer will have a particle size of 1 mm or less, preferably 0.85 mm or less. The average water content of the polymer, after the second-step drying, is preferably in the range of 1~18 weight % and more preferably in the range of 3~10 weight %.

The polymer has particles of different sizes. Therefore, when drying is carried out in a static state, smaller particles dry faster, and larger particles needs a longer time for drying. The faster dried portion of the polymer aggregates, and the resultant aggregate shrinks, so such a shrunk product is easy for a hot wind to blow through and is therefore still easier to dry. On the other hand, the slower dried portion of the polymer merely has a small number of narrow gaps between polymer gels and is therefore difficult to apply a hot wind to and therefore needs a still longer time for drying. Thus, conventionally, the polymer gel, which merely dries slowly by the drying in a static state, needed to be dried to such a degree that the resultant dried product could be ground, for fear that when the polymer was ground after drying, rubber-like undried materials should attach to a roll, pin, hammer, or the like to stop a grinder or that an excessive load should be applied to the grinder. Thus, the faster dried portion of the polymer was excessively heated and therefore easily suffered from thermal deterioration such as increase of the soluble content.

However, if a polymer as roughly disintegrated into a particle size of 20 mm or less is dried in a stirred state and/or a fluidized state, even a polymer with a high water content can be so sufficiently heated that the polymer can be dried in s short time. In addition, because the faster dried portion of the polymer has a slow dry speed, the difference between respective water contents of polymer particles is small. As a result, every particle of the polymer can be uniformly dried, and the ratio of an excessively dried portion of the polymer can be lessened, and further the deterioration during the drying can be prevented.

It is preferable that the conditions of the second-step drying are fitly set for every drying machine so that the material temperature can fall in the range of 100~220° C. When the fluidized bed drying machine is used, the layer thickness of the fluidized bed is preferably in the range of 10~1000 mm and is more preferably in the range of 50~600 mm The present invention further has effects that the absorption capacity of the hydrogel polymer can be raised by carrying out the second-step drying than that after the first-step drying. The absorption capacity (absorption capacity for artificial urine, as defined in the below-mentioned examples of some preferred embodiments) is raised preferably by 0.1~30 g/g, more preferably by 2~20 g/g. When the absorption capacity is raised by more than 30 g/g, the soluble content increases contrary to expectation and therefore the deterioration occurs.

In the present invention, after the second-step drying, a hydrophilic polymer with a particle size of 10~100 μm can be obtained by grinding and classification.

When the hydrophilic polymer is a water-absorbent resin, the vicinity of the surface of the particulate water-absorbent resin may be further subjected to a crosslinking treatment, whereby the absorption capacity under a load can be raised. For the surface-crosslinking treatment, crosslinking agents which are reactable with the water-absorbent resin's having functional groups, for example, acid groups, can be used, and conventional crosslinking agents which are usually used for this usage can be exemplified.

Effects and Advantages of the Invention

When compared with conventional drying only in a static state, the present invention has advantages in that: not only can drying be carried out with good efficiently, but also uniform drying is possible, so a hydrophilic crosslinked polymer having excellent physical properties with little deterioration during the drying can be obtained. Accordingly, the present invention is excellent as a production process of a water-absorbent resin which is very suitable for sanitary materials such as paper diapers and sanitary napkins.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to the below-mentioned examples.

In the present invention, the water content and the absorption capacity and soluble content of the crosslinked polymer were measured by the below methods.

(a) Water Content

About 2.0 g of a particulate sample was measured by thinly spreading it on a container made of aluminum-foil, and the water content (weight %) was measured from the weight after drying at 180° C. for 5 hours.

Water content (weight %)=(weight before drying−weight after drying)/weight before drying×100

(b) Absorption Capacity of Crosslinked Polymer

About 0.2 g of a crosslinked polymer was uniformly placed into a bag made of nonwoven fabric (60 mm×60 mm) and then dipped into artificial urine (comprising sodium sulfate 0.200%, potassium chloride 0.200%, magnesium chloride hexahydrate 0.050%, calcium chloride dihydrate 0.025%, ammonium dihydrogen phosphate 0.085%, diammonium hydrogen phosphate 0.015%, and deionized water 99.425%). After 30 minutes, the bag was pulled up, and swishing water off was carried out at 250 G for 3 minutes by using a centrifuge, and the weight W1 (g) of the bag was measured. Also, the same operation was carried out without using the crosslinked polymer, and the weight W0 (g) of the bag of that time was measured. According to the next formula, the absorption capacity (g/g) of the crosslinked polymer was calculated from these W1 and W0.

Absorption capacity (g/g)=(W1(g)−W0(g) - weight of crosslinked polymer (g))/weight of crosslinked polymer (g)

(c) Soluble Content of Crosslinked Polymer

About 0.5 g of a crosslinked polymer was dispersed into 1000 g of deionized water and then, after stirring for 16 hours, filtrated with a filter paper. Next, 50 g of the obtained filtrate was placed into a 100 ml beaker, and 1 ml of a 0.1 N-aqueous sodium hydroxide solution, 10 ml of an N/200-aqueous methyl glycol chitosan solution and 4 drops of a 0.1% aqueous Toluidine Blue solution were added to the above filtrate. Next, a colloidal titration of the solution in the beaker was carried out by using an N/400-aqueous potassium polyvinylsulfate solution, and the time when the color of the solution changed from blue to purplish red was regarded as the end of the titration, thus measuring the titration amount A (ml). Also, the same operation was carried out by using 50 g of deionized water instead of 50 g of the filtrate, thus measuring the titration amount B (ml) as a blank. Then, according to the next formula, the soluble content (weight %) was calculated from the titration amounts A and B and the molecular weight C of the monomers constituting the crosslinked polymer.

Soluble content (weight %)=(B−A)×0.005/weight (g) of crosslinked polymer×C

PRODUCTION EXAMPLE 1

An aqueous monomer solution, comprising 467.7 g of acrylic acid, 1832 g of sodium acrylate, 6.33 g of polyethylene glycol diacrylate and 4228 g of water, was provided to a reactor having a structure such that a cover was equipped to a stainless twin-arm type kneader (made by Koike Tekko Limited Liability Company) of 10 L in capacity having two sigma type vanes and a jacket. The reaction system was subjected to nitrogen substitution while the aqueous monomer solution was kept at 24° C. Next, 18.2 g of a 20 weight % aqueous sodium persulfate solution and 17.5 g of a 0.1 weight % aqueous L-ascorbic acid solution were added while a blade of the kneader was stirred, thus carrying out the polymerization for 36 minutes. As for the obtained particulate hydrogel crosslinked polymer (1), the average particle diameter was about 3 mm and the water content was about 63 weight %.

EXAMPLE 1

First of all, 1 kg of the particulate hydrogel crosslinked polymer (1), obtained by Production Example 1, was dried in a static state with a hot wind of linear speed 1.0 m/s at 160° C. for 18 minutes using a through-flow batch type drying machine (made by Satake Kagaku Kikai Kogyo & Co., Ltd.; 71-S6 model). Further, the resultant half-dried product (2) like a coarse grain aggregate was roughly disintegrated with a hammer into an average particle diameter of about 1200 μm, thus obtaining a particulate half-dried product (3). As for the half-dried product (3), the absorption capacity was 39 g/g and the water content was 11.5 weight %.

Then, 3.2 kg of the particulate half-dried product (3) was placed into an indirect heating type drying machine (made by Kurimoto, Ltd.; CD-80 model), and drying was carried out in a stirred state by rotating a paddle, as equipped to the drying machine, at an oil temperature of 200° C. of a jacket for 15 minutes. The resultant dried product was finely ground with a laboratory vibration mill and then classified into a particle diameter of 75~850 μm, thus obtaining a crosslinked polymer (4). The water content of the crosslinked polymer (4) was 4.6 weight %. Further, the absorption capacity and the soluble content of the resultant crosslinked polymer (4) were measured and the results thereof are shown in Table 1.

EXAMPLE 2

A crosslinked polymer (5) was obtained in the same way as of Example 1 except that, when the particulate half-dried product (3) was dried in a stirred state, the charged amount and the drying time were changed to 4.8 kg and 18 minutes respectively. The water content of the crosslinked polymer (5) was 4.4 weight %. Further, the absorption capacity and the soluble content of the resultant crosslinked polymer (5) were measured and the results thereof are shown in Table 1.

EXAMPLE 3

First of all, 2 kg of the particulate hydrogel crosslinked polymer (1), obtained by Production Example 1, was dried in a static state with a hot wind of linear speed 1.6 m/s at 170° C. for 16.5 minutes using a through-flow drying apparatus (made by Okawara Seisakusho & Co., Ltd.; STD-1 model). Further, the resultant half-dried product (6) like a coarse grain aggregate was roughly disintegrated with a hammer into an average particle diameter of about 2000 μm, thus obtaining a particulate half-dried product (7). As for the half-dried product (7), the absorption capacity was 42 g/g and the water content was 8.9 weight %.

Then, 3.0 kg of the particulate half-dried product (7) was placed into a fluidized bed drying machine (made by Okawara Seisakusho & Co., Ltd.; FB-0.5 model), and drying was carried out for 12 minutes in a fluidized state at a hot wind temperature of 200° C. and a hot wind speed of 1.5 m/s. The resultant dried product was finely ground with a laboratory vibration mill and then classified into a particle diameter of 75~850 μm, thus obtaining a crosslinked polymer (8). The water content of the crosslinked polymer (8) was 4.1 weight %. Further, the absorption capacity and the soluble content of the resultant crosslinked polymer (8) were measured and the results thereof are shown in Table 1.

EXAMPLE 4

A crosslinked polymer (9) was obtained in the same way as of Example 3 except that, when the particulate half-dried product (7) was dried in a fluidized state, the charged amount and the drying time were changed to 6.0 kg and 22 minutes respectively. The water content of the crosslinked polymer (9) was 4.0 weight %. Further, the absorption capacity and the soluble content of the resultant crosslinked polymer (9) were measured and the results thereof are shown in Table 1.

Comparative Example 1

In the drying of the particulate hydrogel crosslinked polymer (1) in a static state in Example 1, the drying was stopped in a drying time of 15 minutes, thus obtaining a half-dried product (10) comprising an aggregate of undried particles. As for the half-dried product (10), though its surface was dried, the spaces between the aggregate particles and the inner part of the particles were occupied by a rice-cake-like undried gel. Therefore, the half-dried product (10) could not be disintegrated roughly in usual methods, and even the subsequent drying in a stirred or fluidized state could not be carried out. The water content of such a half-dried product (10) was 20.9 weight %.

Comparative Example 2

A comparative crosslinked polymer (11) was obtained in the same way as of Example 1 except that the drying of the particulate half-dried product (3) was yet successively carried out in a static state with a hot wind of 200° C. for 8 minutes using the same through-flow batch type drying machine. The water content of the comparative crosslinked polymer (11) was 4.0 weight %. Further, the absorption capacity and the soluble content of the obtained comparative crosslinked polymer (11) were measured and the results thereof are shown in Table 1. As for the comparative crosslinked polymer (11), the deterioration during the drying was remarkable and, when absorbing water, the polymer fell into roped and slimy condition.

Comparative Example 3

The same procedure as of Example 3 was carried out except that the half-dried product (6) like a coarse grain aggregate, obtained by the drying in a static state, was not roughly disintegrated, and that its drying was yet successively carried out in a static state with a hot wind of 170° C. for 23.5 minutes using the same through-flow drying apparatus. The resultant dried product was finely ground with a laboratory vibration mill and then classified into a particle diameter of 75~850 μm, thus obtaining a comparative crosslinked polymer (12). The water content of the comparative crosslinked polymer (12) was 4.4 weight %. Further, the absorption capacity and the soluble content of the resultant comparative crosslinked polymer (12) were measured and the results thereof are shown in Table 1.

Comparative Example 4

The aggregated half-dried product (2), obtained in Example 1, was roughly disintegrated with a hammer into an average particle diameter of 25 mm. An attempt was made to dry the disintegrated product in a fluidized bed in the same way as Example 3. However, the disintegrated product was not fluidized with a hot wind.

TABLE 1

|  | Water content (weight %) | Absorption capacity (g/g) | Soluble content (weight %) |
|---|---|---|---|
| Example 1 | 4.6 | 51 | 13.1 |
| Example 2 | 4.4 | 50 | 12.9 |
| Example 3 | 4.1 | 51 | 13.7 |
| Example 4 | 4.0 | 52 | 14.2 |

TABLE 1-continued

|  | Water content (weight %) | Absorption capacity (g/g) | Soluble content (weight %) |
| --- | --- | --- | --- |
| Comparative Example 1 | 20.9 | Drying by Stirring or fluidizing was impossible. | |
| Comparative Example 2 | 4.0 | 82 | 40 |
| Comparative Example 3 | 4.4 | 48 | 18.0 |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A production process for a hydrophilic crosslinked polymer, comprising the steps of:
   a) polymerizing an aqueous solution including a hydrophilic monomer and a crosslinking agent to obtain a hydrogel crosslinked polymer, and drying the hydrogel crosslinked polymer, thus obtaining the hydrophilic crosslinked polymer,
   (b) with the step of drying the hydrogel crosslinked polymer comprising the steps of:
      i) drying the hydrogel crosslinked polymer in a static state until it becomes possible to disintegrate an aggregate of the hydrogel crosslinked polymer; then
      ii) disintegrating the dried hydrogel crosslinked polymer into a particle size of 20 mm or less; and then
      iii) drying the disintegrated hydrogel crosslinked polymer in a stirred state and/or fluidized state.

2. A production process for a hydrophilic crosslinked polymer according to claim 1, wherein the step of drying in a static state is carried out until the water content of the hydrogel crosslinked polymer becomes 10–20 weight %.

3. A production process for a hydrophilic crosslinked polymer according to claim 1, wherein the step of drying in a static state is carried out by a drying method in which the hydrogel crosslinked polymer is brought into contact with a hot wind of 120–220° C.

4. A production process for a hydrophilic crosslinked polymer according to claim 1, wherein the step of drying in a stirred state and/or a fluidized state is carried out by a drying method in which the hydrogel crosslinked polymer is dried while stirred by rotation of a rotor.

5. A production process for a hydrophilic crosslinked polymer according to claim 1, wherein the step of drying in a stirred state and/or fluidized state is carried out using a fluidized bed.

6. A production process for a hydrophilic crosslinked polymer according to claim 2, wherein the step of drying in a static state is carried out by a drying method in which the hydrogel crosslinked polymer is brought into contact with a hot wind of 120–220° C.

7. A production process for a hydrophilic crosslinked polymer according to claim 2, wherein the drying in a stirred state and/or a fluidized state is carried out by a drying method in which the hydrogel crosslinked polymer is dried while stirred by rotation of a rotor.

8. A production process for a hydrophilic crosslinked polymer according to claim 3, wherein the step of drying in a stirred state and/or a fluidized state is carried out by a drying method in which the hydrogel crosslinked polymer is dried while stirred by rotation of a rotor.

9. A production process for a hydrophilic crosslinked polymer according to claim 2, wherein the step of drying in a stirred state and/or fluidized state is carried out using a fluidized bed.

10. A production process for a hydrophilic crosslinked polymer according to claim 3, wherein the step of drying in a stirred state and/or fluidized state is carried out using a fluidized bed.

11. A production process for a hydrophilic crosslinked polymer, comprising the steps of:
   a) polymerizing an aqueous solution including a hydrophilic monomer and a crosslinking agent to obtain a hydrogel crosslinked polymer, and drying the hydrogel crosslinked polymer, thus obtaining the hydrophilic crosslinked polymer,
   (b) with the step of drying the hydrogel crosslinked polymer comprising the steps of:
      i) drying the hydrogel crosslinked polymer in a static state until it becomes possible to disintegrate an aggregate of the hydrogel crosslinked polymer, wherein the step of drying in a static state is carried out by a drying method in which the hydrogel crosslinked polymer is brought into contact with a hot gaseous current, wherein the step of drying in a static state is carried out until the water content of the hydrogel crosslinked polymer is 25 weight % or less; then
      ii) disintegrating the dried hydrogel crosslinked polymer into a particle size of 20 mm or less; and then
      iii) drying the disintegrated hydrogel crosslinked polymer in a stirred state, wherein the step of drying in a stirred state is carried out by a drying method in which the hydrogel crosslinked polymer is dried while stirred by rotation of a rotor.

12. A production process for a hydrophilic crosslinked polymer, comprising the steps of:
   a) polymerizing an aqueous solution including a hydrophilic monomer and a crosslinking agent to obtain a hydrogel crosslinked polymer, and drying the hydrogel crosslinked polymer, thus obtaining the hydrophilic crosslinked polymer,
   (b) with the step of drying the hydrogel crosslinked polymer comprising the steps of:
      i) drying the hydrogel crosslinked polymer in a static state until it becomes possible to disintegrate an aggregate of the hydrogel crosslinked polymer, wherein the step of drying in a static state is carried out by a drying method in which the hydrogel crosslinked polymer is brought into contact with a hot gaseous current, wherein the step of drying in a static state is carried out until the water content of the hydrogel crosslinked polymer is 25 weight % or less; then
      ii) disintegrating the dried hydrogel crosslinked polymer into a particle size of 20 nm or less; and then
      iii) drying the disintegrated hydrogel crosslinked polymer in a fluidized state, wherein the step of drying in a fluidized state is carried out using a fluidized bed.

* * * * *